(12) United States Patent
Kim

(10) Patent No.: US 8,181,317 B2
(45) Date of Patent: May 22, 2012

(54) CLAMPING DEVICE, MOULD THEREOF, AND METHOD FOR MANUFACTURING THE SAME

(75) Inventor: Gye Youl Kim, Seoul (KR)

(73) Assignee: Young Kook Cho, Marietta, GA (US)

( * ) Notice: Subject to any disclaimer, the term of this patent is extended or adjusted under 35 U.S.C. 154(b) by 996 days.

(21) Appl. No.: 11/661,165

(22) PCT Filed: Aug. 22, 2005

(86) PCT No.: PCT/KR2005/002767
§ 371 (c)(1),
(2), (4) Date: Mar. 17, 2008

(87) PCT Pub. No.: WO2006/022504
PCT Pub. Date: Mar. 2, 2006

(65) Prior Publication Data
US 2008/0256766 A1    Oct. 23, 2008

(30) Foreign Application Priority Data

Aug. 24, 2004  (KR) .................. 10-2004-0066710

(51) Int. Cl.
*F16B 2/20*  (2006.01)
(52) U.S. Cl. .............................. 24/557; 24/560; 24/562

(58) Field of Classification Search .................... 24/530, 24/545, 546, 547, 555–557, 560–562, 564–567, 24/511
See application file for complete search history.

(56) References Cited

U.S. PATENT DOCUMENTS

| | | | | |
|---|---|---|---|---|
| 2,255,467 A | * | 9/1941 | Kabriel | 24/564 |
| 2,885,758 A | * | 5/1959 | Russo et al. | 24/531 |
| 5,325,570 A | * | 7/1994 | Chin-Ho | 24/530 |

* cited by examiner

*Primary Examiner* — James Brittain
(74) *Attorney, Agent, or Firm* — Sheridan Ross P.C.

(57) ABSTRACT

Disclosed herein is a clamping device which can resiliency clamp an item. The claming device comprises a W-shaped metallic member to impart resilience for clamping an item, and a casing member having the metallic member embedded therein. The casing member is formed of a polymeric material through injection-molding to prevent corrosion of the metallic member while enhancing an appearance of the clamping device. A mold for the clamping device, and a method for manufacturing the same are also disclosed. Since the metallic member for imparting resilience is embedded in the casing member, the clamping device can be easily manufactured as a single component, remarkably reducing manufacturing costs. Additionally, the metallic member is prevented from being corroded, whereby the clamping device has a remarkably enhanced endurance as well as a compact structure and a high quality.

9 Claims, 5 Drawing Sheets

[Fig. 1] (Prior Art)
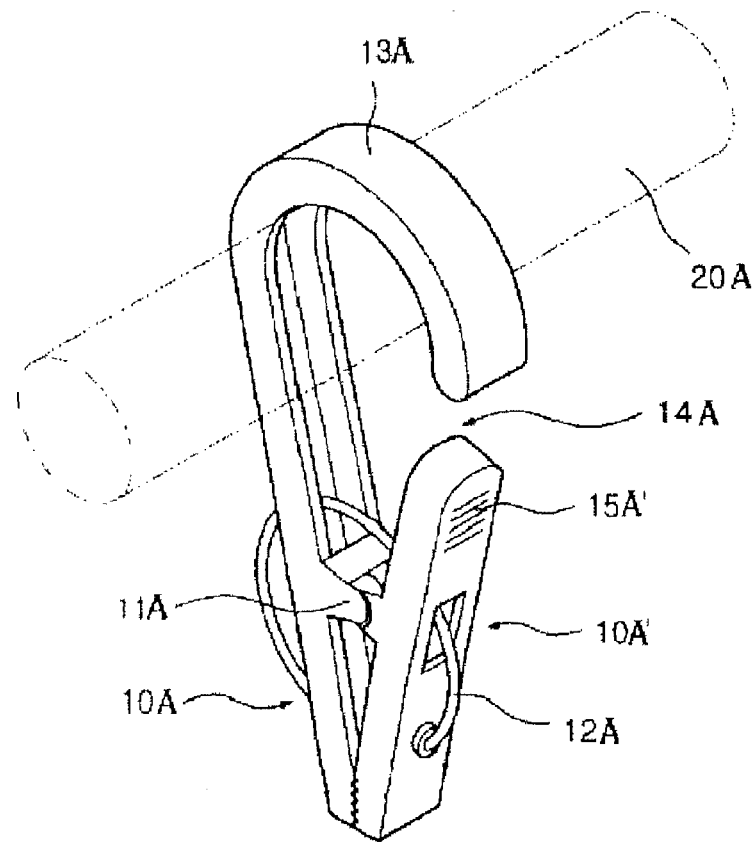
[Fig. 2] (Prior Art)
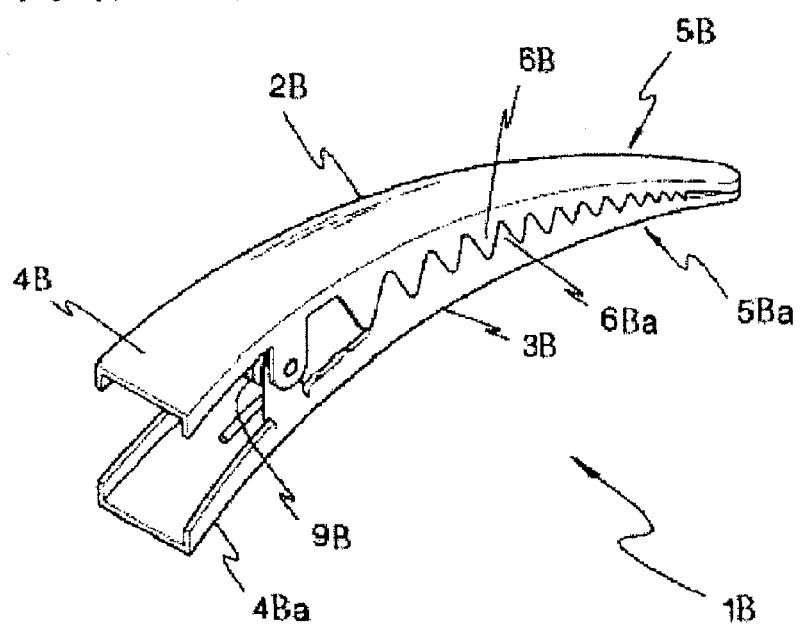

[Fig. 3]
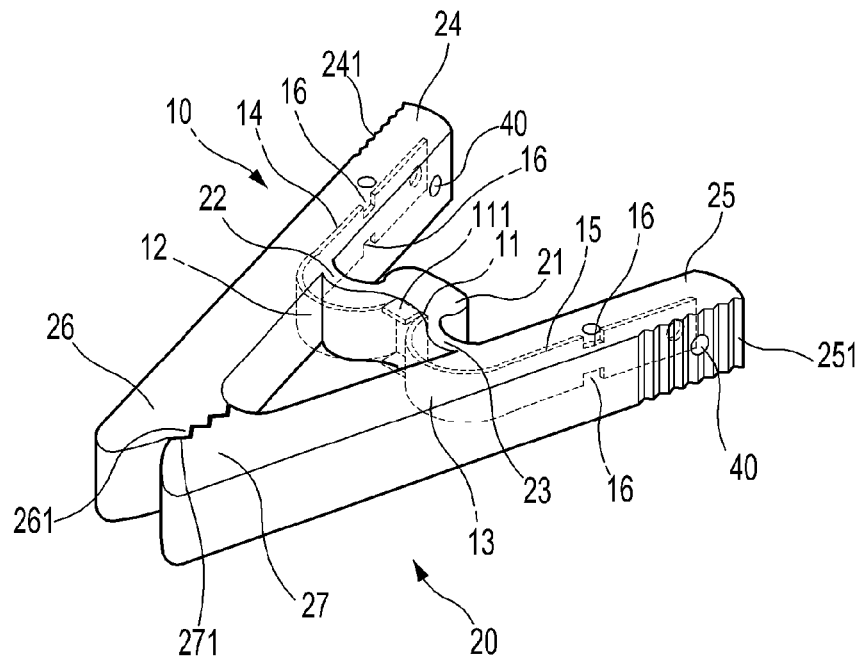
[Fig. 4]
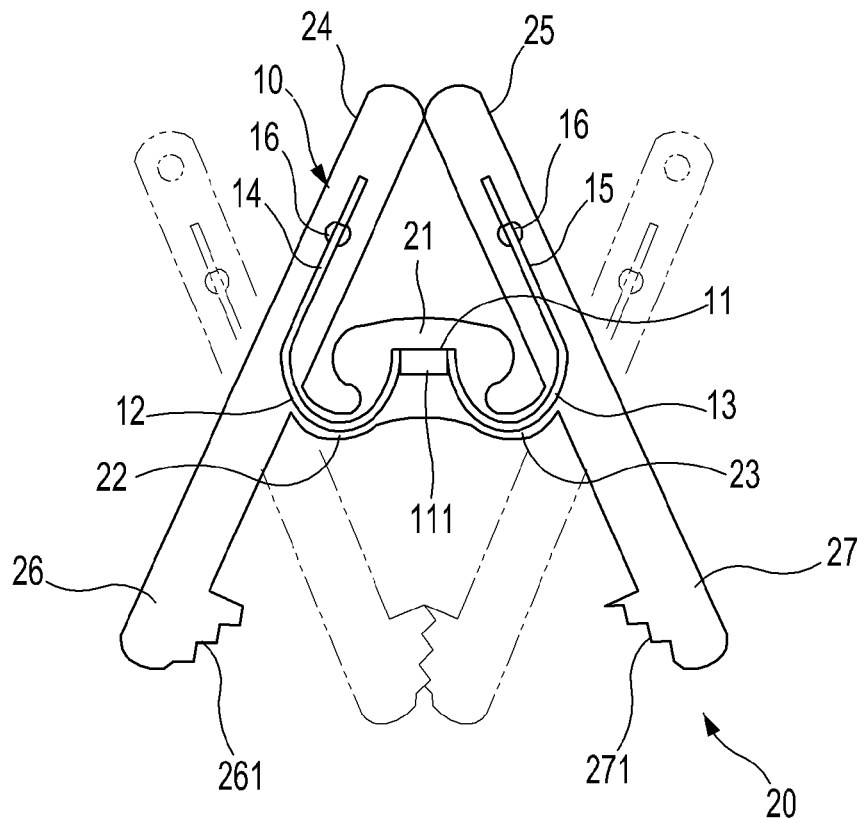

[Fig. 5]
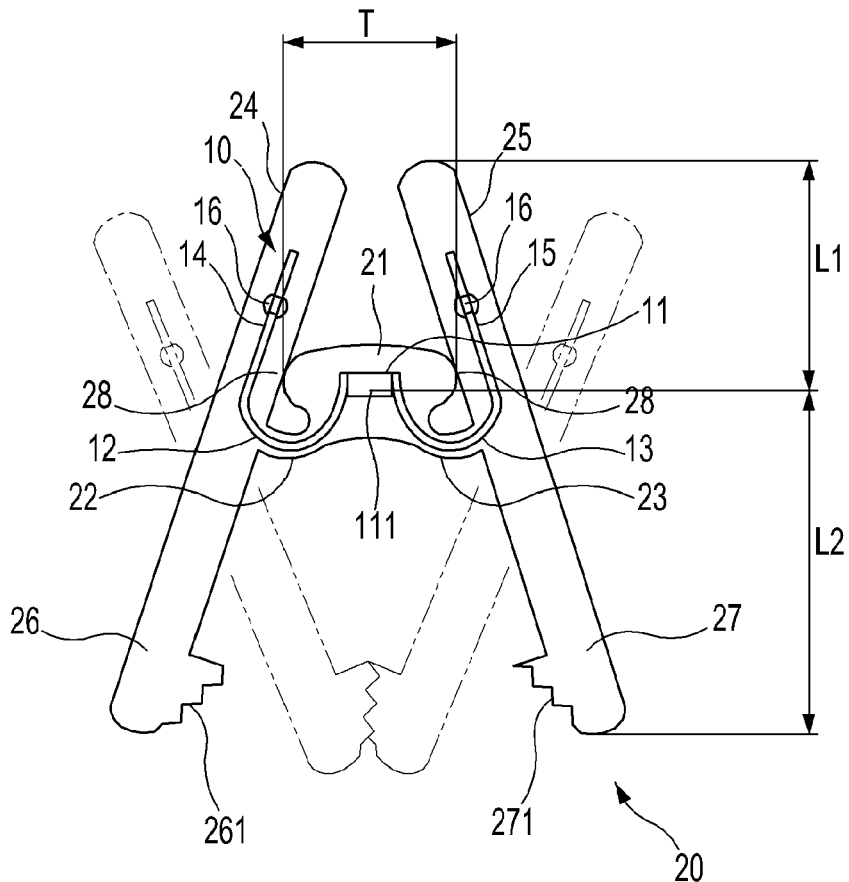
[Fig. 6]
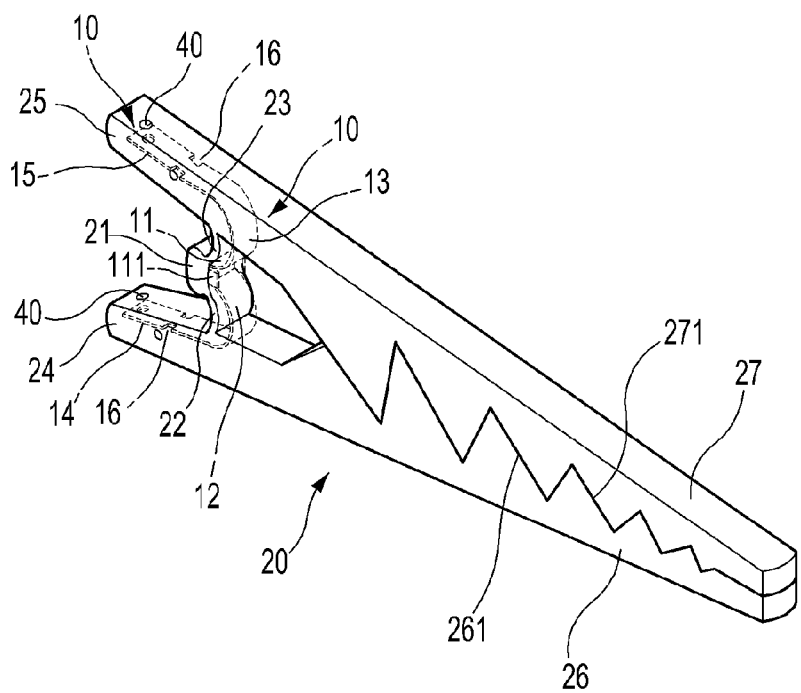

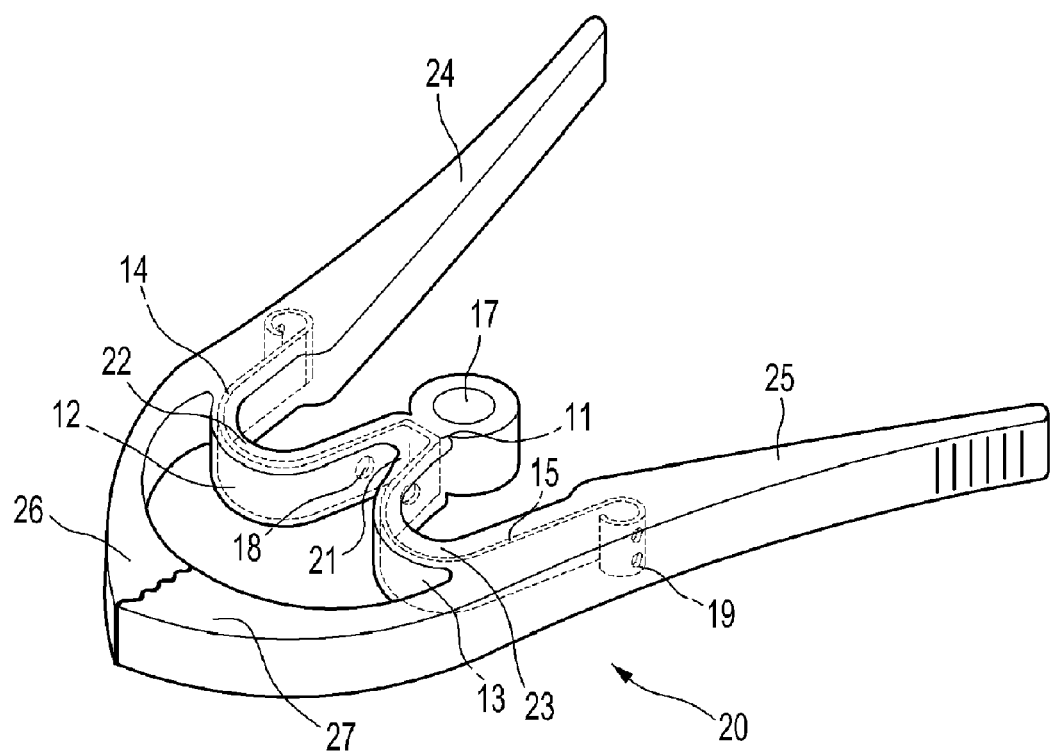
[Fig. 7]

[Fig. 8]
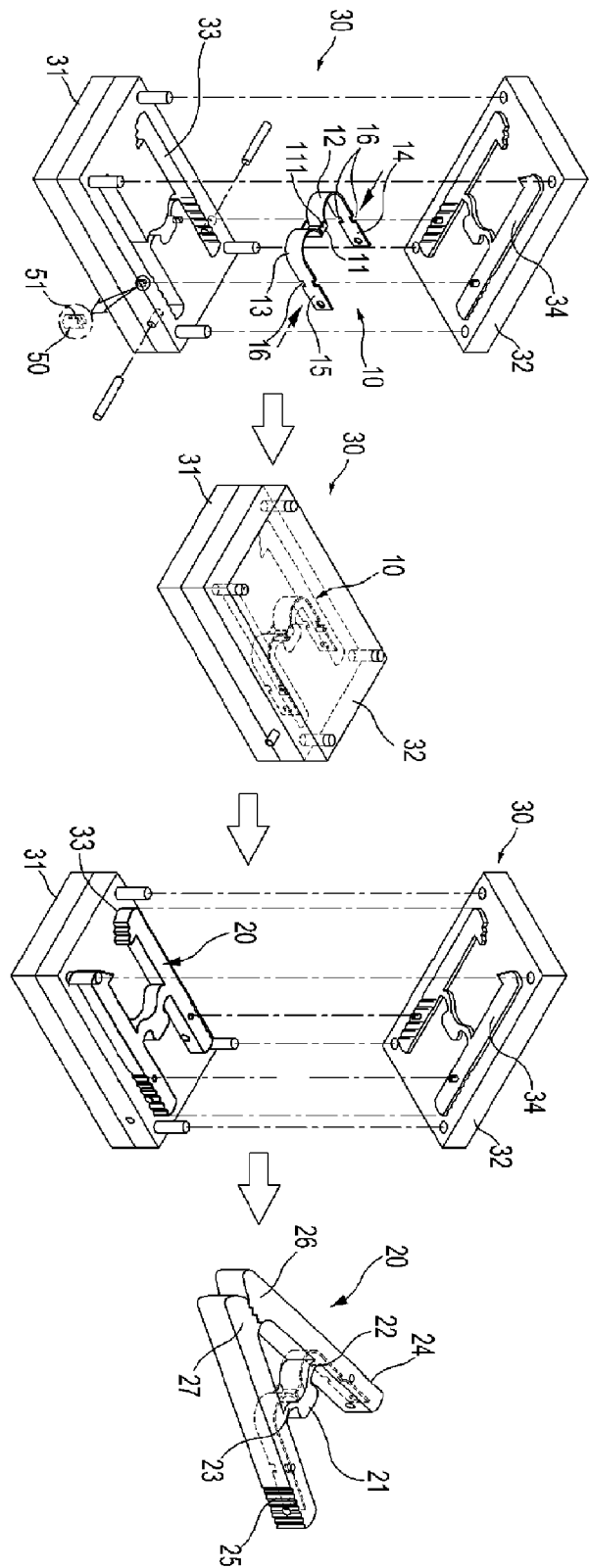

CLAMPING DEVICE, MOULD THEREOF, AND METHOD FOR MANUFACTURING THE SAME

FIELD OF THE INVENTION

The present invention relates to a clamping device which can resiliently clamp an item (referring to a paper, hair and the like to be clamped, which will be referred to hereinafter simply as an 'item'). More particularly, the present invention relates to a high quality clamping device, which has a compact structure to prevent corrosion of a metallic member while ensuring excellent endurance and an aesthetically pleasing appearance of the clamping device as well as easy manufacturing, a method for manufacturing the same, and a mould for the clamping device.

BACKGROUND OF THE INVENTION

Generally, various types of clamping devices, such as paperclips for business, hairpins for hair salon, industrial clamps, which clamp an item with resilience of a resilient body, have been suggested in various shapes. For example, Korean Utility Model Registration No. 0332526 discloses a clothespin for a laundry hanger, and Korean Utility Model Registration No. 0352859 discloses a hairpin.

As shown in FIG. 1 and a claim of Korean Utility Model Registration No. 0332526, the clothespin for the laundry hanger comprises a pair of pinching members 10A and 10A' forced to each other by a spring 12A about a rotational shaft 11A while facing each other, wherein an upper end of the pinching member 10A extends to form a hook 13A curved towards the other pinching member 10B such that a separation between an end of the hook 13A and an upper end of the other pinching member 10B is smaller than a diameter of a dry rod 20A, so that the dry rod 20A can easily pass by the hook 13A when compressing a handle 15A'.

The clothespin for the laundry hanger disclosed in Korean Utility Model Registration No. 0332526 has an advantage in that, since the hook 13A is provided to one of the pinching members 10A and 10A' to prevent the clothespin from being detached from the dry rod, laundry is prevented from being dropped off the dry rod and being tainted.

However, as described above, since the clothespin of Korean Utility Model Registration No. 0332526 comprises the pair of pinching members 10A and 10A', and the spring 12A applying resilience to the pair of pinching members 10A and 10A' to clamp the laundry therebetween, it has a problem in that since at least three components must be assembled to produce the clothespin, manufacturing costs are increased. Additionally, since the spring 12A is formed of a metallic material, it can be corroded, and thus can be gradually decreased in endurance.

As shown in FIG. 1 and a claim of Korean Utility Model Registration No. 0352859, the hairpin is made of a metallic material or synthetic resin, and comprises upper and lower plates, each of which integrally comprises a pinching handle, and a pinching member having fixing ridges and fixing grooves formed at both sides of the pinching member to fix and prevent hairs from being released down, a hinge pin coupling the upper and lower hairpin plates, and a spring inserted onto the hinge pin between the upper and lower hairpin plates. In the disclosure, the hairpin 1B is characterized in that a distance between the upper and lower plates 2B and 3B, each of which integrally comprises pinching handles 4B and 4Ba, is gradually decreased towards a distal end of pinching members 5B and 5Ba. Alternatively, the plurality of fixing ridges 6B and 6Ba formed at both sides of the respective pinching members 5B and 5Ba to engage with each other is decreased in size, and densely arranged.

The hairpin of Korean Utility Model Registration No. 0352859 has an advantage of fixing more hair while preventing the hair from being released.

However, as in the clothespin described above, the hairpin of the disclosure also has problems in that since at least three components comprising the upper and lower plates 2B and 3B, and the spring 9B must be assembled, and since the spring 12A is formed of a metallic material, it can be corroded, it is gradually decreased in endurance.

That is, the conventional clamping device for clamping the item has problems in that, since at least three components are required to produce the clamping device, the manufacturing costs are increased, and since the spring for imparting resilience is made of the metallic material, it is gradually corroded, thereby reducing the endurance of the clamping device.

SUMMARY OF THE INVENTION

Therefore, the present invention has been made in view of the above problems, and it is an object of the present invention to provide a high quality clamping device, which is formed as a single component by inserting a resilient body into a molding material, thereby preventing the resilient body from being corroded and enhancing endurance of the clamping device through as well as lowering manufacturing costs and enhancing the appearance thereof, a method for manufacturing the same, and a mould for the same.

In accordance with an aspect of the present invention, the above and other objects can be accomplished by the provision of a clamping device, comprising: a W-shaped metallic member to impart resilience for clamping an item; and a casing member having the metallic member embedded therein, and formed of a polymeric material through injection-molding to prevent corrosion of the metallic member while enhancing an appearance of the clamping device. At this time, the metallic member may be inserted in the casing member in an unclamped state when injection-molding the casing member.

The polymeric material may comprise one of polyamide and polypropylene.

The metallic member may comprise a supporting portion having a reinforcing portion bent at both sides thereof, first and second resilient portions integrally formed to the supporting portion, each resilient portion being bifurcated and bent in a U shape from either side of the supporting portion to generate the resilience, and first and second extensions integrally extending from the first and second resilient portions, respectively, and the casing member may comprise a hinge portion having the supporting portion of the metallic member embedded therein, first and second injection-molded resilient portions integrally injection-molded with the hinge portion and having the first and second resilient portions of the metallic member embedded therein, first and second press portions integrally injection-molded with the first and second resilient portions to act as handles for applying force to unclamp the item around the hinge portion, and first and second clamping portions integrally injection-molded with the first and second press portions to act as a pinching member to clamp the item around the hinge portion.

The first and second extensions of the metallic member may have holding grooves formed thereon to allow the casing member to be injection-molded in an unclamped state. Alternatively, the first and second extensions of the metallic member may have a ring-shaped fixing hole formed at distal ends of the first and second extensions. The fixing hole may have a through-hole formed therein for easy injection of a molten polymeric material.

The supporting portion, the first and second resilient portions, and the first and second extensions of the metallic member may have through-holes formed therein, respectively, to allow the molten polymeric material to be easily infiltrated therethrough.

The hinge portion may have a regulating portion formed by extending a width of the hinge portion to prevent the first and second press portions from being excessively compressed. The hinge portion may have a ring-shaped fixing portion integrally formed thereto through injection-molding to keep the clamping device on a nail or a string.

The first and second press portions may have slide preventing ridges formed thereon to prevent fingers from sliding when compressing the press portions, respectively, and the first and second clamping portions may have clamping ridges formed thereon to allow the item to be firmly clamped, respectively.

In accordance with another aspect of the present invention, a mould for manufacturing a clamping device is provided, which comprises: first and second mould members respectively having first and second molding portions formed therein to form a casing member integrally comprising a hinge portion, first and second injection-molded resilient portions, first and second press portions, and first and second clamping portions through injection-molding; and fixing protrusions formed on the first and second molding portions, and having receiving grooves fitted into holding grooves formed on first and second resilient portions of a metallic member for resiliently clamping an item so as to force the metallic member to be inserted into the first and second molding portions in an unclamped state.

In accordance with yet another aspect of the present invention, there is provided a method for manufacturing a clamping device, the clamping device comprising a metallic member to resiliently clamp an item, and a casing member integrally having a hinge portion, first and second injection-molded resilient portions, first and second press portions, and first and second clamping portions, the method comprising the steps of: separating first and second mould members having first and second molding portions formed therein to form the casing member with the metallic member embedded therein through injection-molding, respectively; inserting the metallic member into the first and second metallic members by compressing the metallic member such that holding grooves of the metallic member are fitted into receiving grooves formed on fixing protrusions of the first and second mould members to force the casing member to be in an unclamped state; injection-molding the casing member to have a desired shape by injecting a molten polymeric material into the first and second molding portions of the first and second mould members after closing the first and second mould members; and ejecting the casing member from the mould members.

As apparent from the above description, according to the present invention, since a metallic member for imparting resilience is embedded in a casing member through injection-molding, the clamping device of the invention can be easily manufactured as a single component, remarkably reducing manufacturing costs. Additionally, since the metallic member is embedded in the casing member, the metallic member is prevented from being corroded, whereby the clamping device has a remarkably enhanced endurance as well as a compact structure and a high quality.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view schematically illustrating a conventional clothespin for a laundry hanger;

FIG. 2 is a perspective view schematically illustrating a conventional hairpin;

FIG. 3 is a perspective view illustrating a clamping device in accordance with a first embodiment of the present invention;

FIG. 4 is an operational view illustrating clamped and unclamped states of the clamping device in accordance with the first embodiment of the present invention;

FIG. 5 is an operational view illustrating clamped and unclamped states of a clamping device in accordance with a second embodiment of the present invention;

FIG. 6 is a perspective view illustrating a clamping device in accordance with a third embodiment of the present invention;

FIG. 7 is a perspective view illustrating a clamping device in accordance with a fourth embodiment of the present invention; and FIG. 8 is a flow diagram schematically illustrating a method for manufacturing a clamping device in accordance with the present invention.

DETAILED DESCRIPTION OF PREFERRED EMBODIMENTS OF THE PRESENT INVENTION

Reference will now be made in detail to the embodiments of the present invention with reference to the accompanying drawings.

FIG. 3 is a perspective view illustrating a clamping device in accordance with a first embodiment of the present invention, FIG. 4 is an operational view illustrating clamping and unclamping states of the clamping device in accordance with the first embodiment of the invention, FIG. 5 is an operational view illustrating other clamping and unclamping states of the clamping device in accordance with the first embodiment of the invention, FIG. 6 is a perspective view illustrating a clamping device in accordance with a second embodiment of the invention, FIG. 7 is a perspective view illustrating a clamping device in accordance with a third embodiment of the invention, and FIG. 8 is a flow diagram schematically illustrating a method for manufacturing a clamping device in accordance with the invention.

Referring to FIGS. 3 to 8, reference numeral 10 indicates a metallic member, which has a substantially W shape to resiliently clamp an item such as a paper, and is formed of a metallic material such as steel. The metallic member 10 comprises a supporting portion 11 which has a reinforcing portion 111 at the center of the supporting portion 11. The reinforcing portion 111 is bent at both sides thereof to prevent deformation of first and second resilient portions 12 and 13 described below while supporting them to generate resilience. The first and second resilient portions 12 and 13 are integrally formed to the supporting portion 11, and are bifurcated from both sides of the support portion 11, and bent substantially in a U shape to generate the resilience. First and second extensions 14 and 15 integrally extend from the first and second resilient portions 12 and 13, respectively.

In other words, the metallic member 10 serves to generate the resilience for clamping the item, and comprises the supporting portion 11 having the reinforcing portion 111, the first and second resilient portions 12 and 13 respectively bent from the supporting portion 11 to generate the resilience, and the first and second extensions 14 and 15 respectively extending from the first and second resilient portions 12 and 13. The metallic member 10 is embedded in a casing member described below through injection-molding.

Each of the first and second extensions 14 and 15 is formed with holding grooves 16 which can hold an associated resilient portion of the metallic member 10 in an unclamped state inside a mould to allow the casing member to be injection-molded in an unclamped state.

That is, the holding grooves 16 are formed on the first and second extensions 14 and 15 of the metallic member 10, so that, when the casing member is formed to embed the metallic member 10 therein through injection-molding, the metallic member 10 is held in the casing member in a state wherein the metallic member 10 unclamps the item, as shown in FIG. 8.

Reference numeral 20 indicates the casing member which is formed to have the metallic member 10 embedded therein through injection-molding in order to prevent corrosion of the metallic member 10 and to provide an aesthetically pleasing appearance. The casing member 20 defines the appearance of the clamping device which clamps the item with the resilience of the metallic member 10, and is formed of a polymeric material, such as polyamide or polypropylene, which has excellent mechanical properties such as wear resistance, thermal formability, and the like.

The casing member 20 comprise a hinge portion 21 having the supporting portion 11 of the metallic member 10 embedded therein, first and second injection-molded resilient portions 22 and 23 integrally injection-molded with the hinge portion 11 and having the first and second resilient portions 12 and 13 of the metallic member 10 embedded therein, first and second press portions 24 and 25 integrally injection-molded with the first and second resilient portions 22 and 23 to act as handles to apply force to unclamp the item around the hinge portion 21, and first and second clamping portions 26 and 27 integrally injection-molded with the first and second press portions 24 and 25 to act as a pinching member to clamp the item around the hinge portion 21.

According to the present invention, preferably, the hinge portion 21 has a thickness of 3 □ or more, and the first and second resilient portions 22 and 23 have a thickness of 1~2 □ so as to ensure flexibility. Preferably, the first and second press portions 24 and 25, and the first and second clamping portions 26 and 27 have a thickness of 3 □ or more so as to ensure hardness.

Meanwhile, for a clamping device according to a second embodiment in which a length L1 of the first and second press portions 24 and 25 is shorter than a length L2 of the first and second clamping portions 26 and 27 as shown in FIG. 5, the hinge 21 is formed with a regulating portion 28 in order to prevent the first and second resilient portions 12 and 13 of the metallic member 10 from being lowered in resilience due to excessive pressing of the first and second press portions 24 and 25 when applying forcing to the first and second press portions 24 and 25. The regulating portion 28 is formed by enlarging a width T of the hinge portion 21 to regulate a pressed width of the first and second press portions 24 and 25.

The first and second press portions 24 and 25 have slide preventing ridges 241 and 251 formed thereon to prevent fingers from sliding when compressing the press portions 24 and 25, respectively. The first and second clamping portions 26 and 27 have clamping ridges 261 and 271 formed thereon to allow the item to be firmly clamped by the clamping portions 26 and 27, respectively.

The first and second press portions 24 and 25 of the casing member 20 are formed with through-holes 40 to keep the casing member 20 on a nail or a string.

Meanwhile, reference numeral 30 in FIG. 8 indicates a mould to form the casing member 20 with the metallic member 10 embedded therein through injection-molding. The mould 30 comprises first and second mould members 31 and 32, which are formed with first and second molding portions 33 and 34 to allow the casing member 20 to be formed in the unclamped state through injection-molding, respectively.

Each of the first and second molding portions 33 and 34 of the first and second mould members 31 and 32 is formed with a fixing protrusion 50 having a receiving groove 51 formed thereon. The fixing protrusions 50 of the first and second molding portions 33 and 34 force the first and second resilient portions 12 and 13 of the metallic member 10 to be held in a compressed state in a direction of an arrow, such that the casing member 20 is in a clamped state by virtue of the resilience of the metallic member 10 after being injection-molded.

Thus, when completing injection-molding of the casing member 20 using the first and second mould members 31 and 32, the first and second clamping portions 26 and 27 of the casing member 20 are in the clamped state, as shown in FIG. 3, such that the clamping device is used to clamp the item.

Meanwhile, FIGS. 6 and 7 show other clamping devices according to third and fourth embodiments of the present invention. As shown in FIGS. 6 and 7, the clamping device of the present invention can be modified into various shapes, so long as the clamping device comprises the metallic member 10 to generate resilience, and the casing member 20 formed to embed the metallic member 10 and to integrally comprise the hinge portion 21, the first and second resilient portions 22 and 23, the first and second press portions 24 and 25, and first and second clamping portions 26 and 27 through injection-molding.

For example, in the clamping device according to the embodiment shown in FIG. 7, a ring-shaped fixing hole 17 is formed at distal ends of the first and second extensions 14 and 15 of the metallic member 10 instead of the holding grooves 16 of the metallic member 10 such that the metallic member 10 is held in the casing member 20 in the unclamped state. Additionally, any one of the supporting portion 11, the first and second resilient portions 12 and 13, and the first and second extensions 14 and 15 of the metallic member 10 has at least one through-hole 18 formed therein. Preferably, the through holes 18 are formed in the first and second resilient portions 12 and 13 close to the supporting portion 11, as shown in FIG. 7, allowing the polymeric material and the metallic material 10 to be firmly coupled with each other. In this case, the fixing hole 17 is formed with a through-hole 19 to allow a molten polymeric material to be easily injected thereinto.

Operation of the clamping device will be described hereinafter together with a method for manufacturing the clamping device of the invention using the mould.

First, the method for manufacturing the clamping device of the invention using the mould described above will be described hereinafter with reference to FIG. 8.

First, the first and second mould members 31 and 32 are separated such that a metallic member 10 is inserted in one of the first and second molding portions 33 and 34 respectively formed in the first and second mould members 31 and 32 in order to form a casing member 20 with the metallic member 20 embedded therein through injection-molding.

Then, the metallic member 10 is inserted into the first mould member 31 while being compressed in a direction of arrows (with the casing member 20 in an unclamped state). That is, the metallic member 10 is compressed to allow the holding grooves 16 of the metallic member 10 to be received in the receiving grooves 51 on the fixing protrusion 50 of the first mould member 31, so that the metallic member 10 is held in the first mould member 31 in an unclamping state.

Then, the first and second mould members 31 and 32 are coupled, and a molten polymeric material comprising polyamide or polypropylene is injected into the first and second molding portions 33 and 34.

After injecting the molten material into the first and second molding portions 33 and 34, a predetermined pressure is applied to the molten polymeric material until a casing member 20 having a desired shape is formed within the first and second molding portions 33 and 34, and then the polymeric material is cooled. Finally, the first and second mould members 31 and 32 are opened, and the casing member 20 is ejected from the first and second mould members 31 and 32.

When the casing member 20 is ejected from the first and second mould members 31 and 32, the first and second clamping portions 26 and 27 are brought into contact with each other, and are in a clamping state by virtue of resilience of the metallic member 10.

For the clamping device of the invention, the first and second resilient portions 12 and 13 of the metallic member 10 is embedded in the first and second injection-molded resilient portions 22 and 23 having a thickness of 1~2 □ so as to ensure flexibility. Thus, when completing injection-molding of the casing member 20 using the mould, the first and second clamping portions 26 and 27 are brought into resilient contact with each other to force an item to be clamped thereby.

In addition, for the clamping device of the invention, the hinge portion 21, the first and second press portions 24 and 25, and first and second clamping portions 26 and 27 of the casing member 20 are formed to have a thickness of 3 □ or more through injection-molding so as to ensure hardness of the clamping device. As a result, when compressing the first and second press portions 24 and 25, the first and second clamping portions 26 and 27 are separated around the hinge portion 21 by virtue of resilience of the first and second resilient portions 12 and 13, and are in the unclamped state.

Moreover, the clamping device of the invention is produced by injection-molding of the casing member with the metallic member 10 held therein in the unclamped state, so that the clamping device has a good appearance as well as lowered manufacturing costs.

Furthermore, the metallic member 10 is embedded in the casing member 20, so that the metallic member 10 is prevented from being corroded, remarkably enhancing the endurance of the clamping device.

According to the present invention, since a metallic member for imparting resilience is embedded in a casing member through injection-molding, the clamping device of the invention can be easily manufactured as a single component, remarkably reducing manufacturing costs. Additionally, since the metallic member is embedded in the casing member, the metallic member is prevented from being corroded, whereby the clamping device has a remarkably enhanced endurance as well as a compact structure and a high quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A clamping device, comprising: a W-shaped metallic member to impart resilience for clamping an item; and a casing member having the metallic member embedded therein so that the metallic member is not exposed to exterior, and formed of a polymeric material through injection-molding to prevent corrosion of the metallic member while enhancing an appearance of the clamping device, wherein the metallic member is inserted into the casing member in an unclamped state and a compressed state when injection-molding the casing member, wherein the metallic member comprises a supporting portion having a reinforcing portion bent at both sides thereof, first and second resilient portions integrally formed to the supporting portion, each resilient portion being bifurcated and bent in a U shape from either side of the supporting portion to generate resilience, and first and second extensions integrally extending from the first and second resilient portions, respectively, and wherein the casing member comprises a hinge portion having the supporting portion of the metallic member embedded therein, first and second injection-molded resilient portions integrally injection-molded with the hinge portion and having the first and second resilient portions of the metallic member embedded therein, first and second press portions integrally injection-molded with the first and second resilient portions to act as handles for applying force to unclamp the item around the hinge portion, and first and second clamping portions integrally injection-molded with the first and second press portions to act as a pinching member to clamp the item around the hinge portion.

2. The device according to claim 1, wherein the first and second extensions of the metallic member have holding grooves formed thereon to allow the casing member to be injection-molded in an unclamped state.

3. The device according to claim 1, wherein the first and second extensions of the metallic member have a ring-shaped fixing hole formed at distal ends of the first and second extensions to allow the casing member to be injection-molded in an unclamped state.

4. The device according to claim 3, wherein the fixing hole has a through-hole formed therein such that the molten polymeric material is easily infiltrated therethrough.

5. The device according to claim 1, wherein the supporting portion, the first and second resilient portions, and the first and second extension of the metallic member have through-holes formed therein, respectively, to allow a molten polymeric material to be easily infiltrated therethrough.

6. The device according to claim 1, wherein the hinge portion has a regulating portion formed by extending a width of the hinge portion to prevent the first and second press portions from being excessively compressed.

7. The device according to claim 1, wherein the hinge portion has a ring-shaped fixing portion integrally formed thereto through injection-molding to keep the clamping device on a nail or a string.

8. The device according to claim 1, wherein the first and second press portions have slide preventing ridges formed thereon to prevent fingers from sliding when compressing the press portions, respectively.

9. The device according to claim 1, wherein the first and second clamping portions have clamping ridges formed thereon to allow the item to be firmly clamped, respectively.

* * * * *